US006950939B2

(12) United States Patent
Tobin

(10) Patent No.: US 6,950,939 B2
(45) Date of Patent: Sep. 27, 2005

(54) PERSONAL TRANSACTION DEVICE WITH SECURE STORAGE ON A REMOVABLE MEMORY DEVICE

(75) Inventor: Christopher M. Tobin, McLean, VA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 871 days.

(21) Appl. No.: 09/977,742

(22) Filed: Oct. 15, 2001

(65) Prior Publication Data

US 2002/0077992 A1 Jun. 20, 2002

Related U.S. Application Data

(60) Provisional application No. 60/254,338, filed on Dec. 8, 2000.

(51) Int. Cl.[7] .............................................. G06F 11/30
(52) U.S. Cl. ....................... 713/182; 713/168; 713/189; 713/200; 713/201
(58) Field of Search ................................. 713/182, 168, 713/189, 200, 201

(56) References Cited

U.S. PATENT DOCUMENTS

| | | |
|---|---|---|
| 4,582,985 A | 4/1986 | Lofberg |
| 5,329,589 A | 7/1994 | Fraser et al. |

(Continued)

FOREIGN PATENT DOCUMENTS

| | | |
|---|---|---|
| EP | 1 033 687 A2 | 9/2000 |
| EP | 1 085 424 A1 | 3/2001 |

(Continued)

OTHER PUBLICATIONS

Pack, "Traditional Retailers Plan Interactive Stores", Orlando Sentinel, May 25, 1995.
Tryllian Mobile Agents: Going Beyond the Web, A Commercial White Paper, Version 1.0– May 18, 2000, p. 1–21.
Alan Neibauer, "Running Microsoft Outlook 98", Microsoft Press, p. 44–55 (Copyright 1998).
About Gossip, http://www.Tryllian.com including Quickstart Guide, Products and Downloads (6 pgs) (Copyright 1999–2000).

(Continued)

Primary Examiner—Thomas R. Peeso
(74) Attorney, Agent, or Firm—Blakely, Sokoloff, Taylor & Zafman LLP

(57) ABSTRACT

An electronic system includes a user transaction device that provides a device identifier when coupled to a transaction terminal. The transaction terminal is configured to indicate that a transaction is to be performed when coupled to the user transaction device. The electronic system also includes a transaction privacy clearinghouse (TPCH), coupled selectively to the user transaction device when a transaction is to be performed. The TPCH is coupled to receive the device identifier and accessible data. Additionally, the accessible data is to be stored in a public storage area of a memory storage device that can be communicatively coupled to the user transaction device. The TPCH authorizes a transaction based upon the device identifier and the accessible data that includes account information of a user that is authorized to use the user transaction device. Moreover, a transaction is authorized without providing the identity of the user to the transaction terminal. The memory storage device also includes a private storage area for storage of confidential data such that the private storage area is to be encrypted with a key that is to be stored in the user transaction device.

64 Claims, 6 Drawing Sheets

U.S. PATENT DOCUMENTS

| | | | |
|---|---|---|---|
| 5,436,972 | A | 7/1995 | Fischer |
| 5,615,277 | A | 3/1997 | Hoffman |
| 5,623,552 | A | 4/1997 | Lane |
| 5,737,701 | A | 4/1998 | Rosenthal et al. |
| 5,815,665 | A | 9/1998 | Teper et al. |
| 5,878,139 | A | 3/1999 | Rosen |
| 5,970,723 | A | 10/1999 | Kinkel et al. |
| 5,990,804 | A | 11/1999 | Koyama |
| 6,002,770 | A | 12/1999 | Tomko et al. |
| 6,002,787 | A | 12/1999 | Takhar et al. |
| 6,029,141 | A | 2/2000 | Bezos et al. |
| 6,105,010 | A | 8/2000 | Musgrave |
| 6,119,096 | A | 9/2000 | Mann et al. |
| 6,148,241 | A | 11/2000 | Ludtke et al. |
| 6,282,552 | B1 | 8/2001 | Thompson et al. |
| 6,311,214 | B1 | 10/2001 | Rhoads |
| 6,356,905 | B1 | 3/2002 | Gershman et al. |
| 6,609,113 | B1 | 8/2003 | O'Leary et al. |
| 2002/0147914 | A1 | 10/2002 | Arnold |

FOREIGN PATENT DOCUMENTS

| | | |
|---|---|---|
| TW | 351799 | 2/1999 |
| WO | WO 95/13591 | 5/1995 |
| WO | 99/06928 | 2/1999 |
| WO | WO 01/08055 A1 | 2/2001 |
| WO | WO 01/22351 A1 | 3/2001 |
| WO | WO 01/50428 A1 | 7/2001 |
| WO | WO 01/59732 A1 | 8/2001 |

OTHER PUBLICATIONS

Alan Freedman, The Computer Desktop Encyclopedia ($2^{nd}$ Ed.), pp. 16, 86,1029, The Computer Language Company Inc., Point Pleasant, PA(Copyright 1999).

"Demand jumps for high–tech ID producer," Business First, vol. 18, No. 3, p. 1; ISSN: 07499418, (Oct. 22, 2001), Copyright 2001 Bell & Howell Information and Learning, Business Dateline, Copyright 2001 American City Business Journals Business First.

PERSONAL TRANSACTION DEVICE WITH SECURE STORAGE ON A REMOVABLE MEMORY DEVICE

RELATED APPLICATIONS

This application claims the benefit of U.S. Provisional Application Ser. No. 60/254,338 filed on Dec. 8, 2000, which is hereby incorporated by reference.

BACKGROUND OF THE INVENTION

1. Field of the Invention

The present invention relates to a device coupled to a removable memory device having a secure storage.

2. Art Background

Transactions are preformed everyday over different networks, such as the Internet, and through point of sale (POS) or bank systems. Such systems are designed to maintain the integrity of the user's credit card, debit card, and account number. However, no measures are taken to ensure the privacy of the user. As the vendor retains information regarding the identity of the user, the user is open to receipt of marketing materials that may result from the data mining of transactions performed on a particular network.

Moreover, consumers of different devices connecting to the different networks and through POS or bank systems are concerned regarding the storage of confidential information including personal information, financial information, etc. in such devices. Some consumers perceive more control over such information handled within a traditional wallet, that is the wallet having this information that a user can simply inspect, to perhaps ensure that this information that could include the consumer's social security number, mother's maiden name, car lock combination, etc. would not be compromised in the even of loss or theft.

SUMMARY OF THE INVENTION

An electronic system includes a user transaction device that provides a device identifier when coupled to a transaction terminal. The transaction terminal is configured to indicate that a transaction is to be performed when coupled to the user transaction device. The electronic system also includes a transaction privacy clearinghouse (TPCH), coupled selectively to the user transaction device when a transaction is to be performed. The TPCH is coupled to receive the device identifier and accessible data. Additionally, the accessible data is to be stored in a public storage area of a memory storage device that can be communicatively coupled to the user transaction device. The TPCH authorizes a transaction based upon the device identifier and the accessible data that includes account information of a user that is authorized to use the user transaction device. Moreover, a transaction is authorized without providing the identity of the user to the transaction terminal. The memory storage device also includes a private storage area for storage of confidential data such that the private storage area is to be encrypted with a key that is to be stored in the user transaction device.

BRIEF DESCRIPTION OF THE DRAWINGS

The objects, features and advantages of the present invention will be apparent from the following detailed description in which.

DETAILED DESCRIPTION

In the following descriptions for the purposes of explanation, numerous details are set forth in order to provide a thorough understanding of the present invention. However, it will be apparent to one skilled in the art that these specific details are not required in order to practice the present invention. In other instances, well known electrical structures or circuits are shown in block diagram form in order not to obscure the present invention unnecessarily.

In one embodiment, a system and method enable a user to conduct electronic commerce transactions without compromising the user's personal identification information and identity, while also providing enhanced direct marketing for vendors. The following description discusses embodiments in the context of Internet and point of sale (POS) networks. However, it is readily apparent that embodiments are not limited to these particular networks, and are applicable to any network that is configured to perform a transaction.

In an embodiment, a personal transaction device is communicatively coupled to a detachable memory storage device, wherein the detachable memory storage device includes public and private storage areas. In one such embodiment, the encryption/decryption key for the private storage area is stored in the memory of the personal transaction device. Accordingly, if the detachable memory storage device were lost or stolen, the data within the private storage area would remain inaccessible without the personal transaction device that includes the key for the encrypted data.

Figure 1:
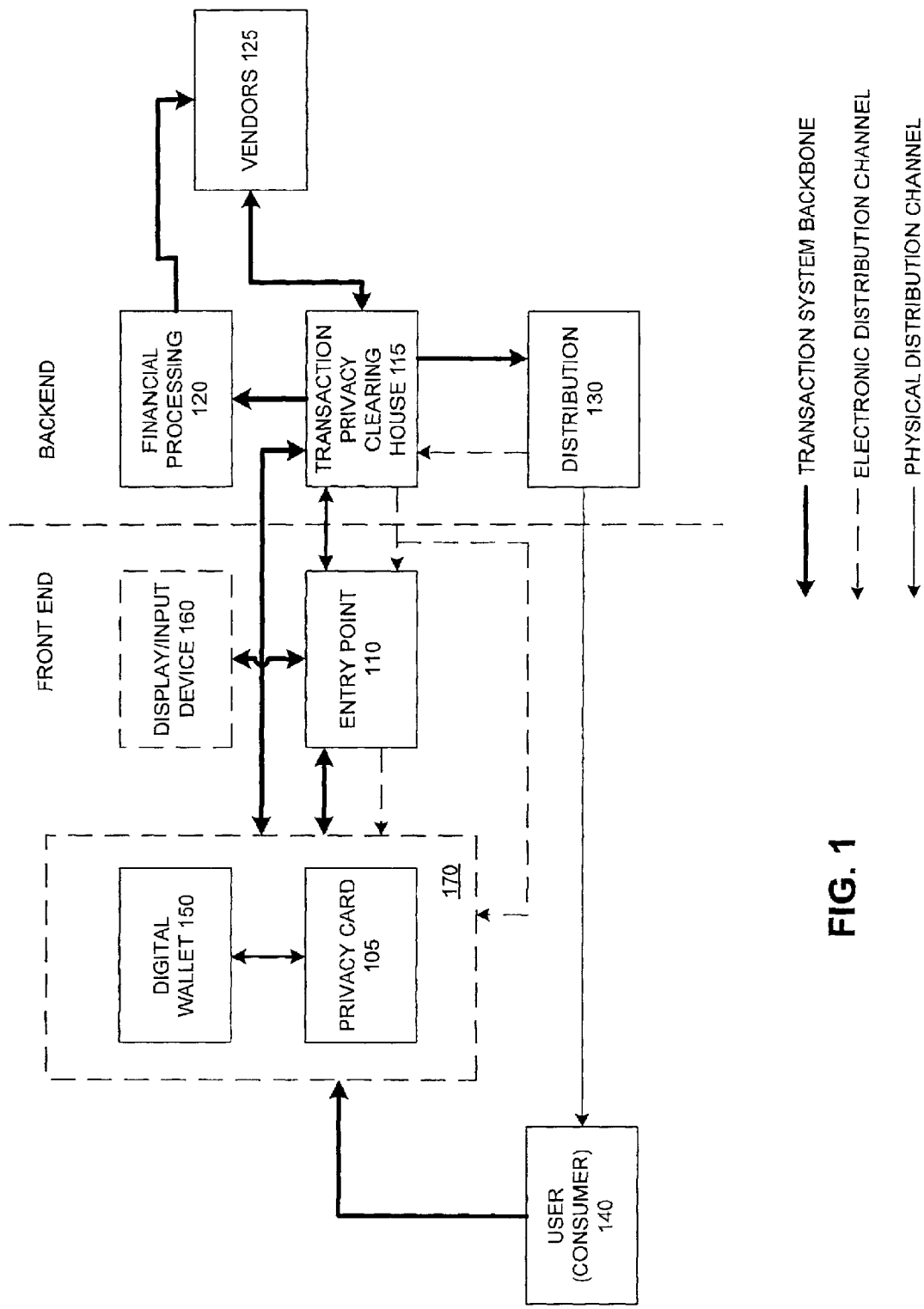
FIG. 1 is a simplified block diagram of one embodiment of a secure transaction system.

FIG. 1 is a block diagram of one embodiment of a secure transaction system, which may be used in electronic commerce. In this embodiment, a transaction privacy clearing house (TPCH) 115 interfaces a user (consumer) 140 and a vendor 125. In this particular embodiment, a personal transaction device (PTD) 170, e.g., a privacy card 105, or a privacy card 105 coupled to a digital wallet 150, is used to maintain the privacy of the user while enabling the user to perform transactions. In an alternate embodiment, the PTD 170 may be any suitable device that allows unrestricted access to TPCH 130. The personal transaction device information is provided to the TPCH 115 that then indicates to the vendor 125 and the user 140 approval of the transaction to be performed.

In order to maintain confidentiality of the identity of the user 140, the transaction device information does not provide user identification information. Thus, the vendor 125 or other entities do not have user information but rather transaction device information. The TPCH 115 maintains a secure database of transaction device information and user information. In one embodiment, the TPCH 115 interfaces to at least one financial processing system 120 to perform associated financial transactions, such as confirming sufficient funds to perform the transaction, and transfers to the vendor 125 the fees required to complete the transaction. In addition, the TPCH 115 may also provide information through a distribution system 130 that, in one embodiment, can provide a purchased product to the user 140, again without the vendor 125 knowing the identification of the user 140. In an alternate embodiment, the financial processing system 120 need not be a separate entity but may be incorporated with other functionality. For example, in one embodiment, the financial processing system 120 may be combined with the TPCH 115 functionality.

In one embodiment, the financial processing system (FP) 120 performs tasks of transferring funds between the user's account and the vendor's account for each transaction. In one embodiment, the presence of the TPCH 115 means that no details of the transactions, other than the amount of the transactions and other basic information, are known to the FP 120. The TPCH 115 issues transaction authorizations to the FP 120 function on an anonymous basis on behalf of the user over a highly secure channel. The FP 120 does not need to have many electronic channels receiving requests for fund transfer, as in a traditional financial processing system. In one embodiment, a highly secure channel is set up between the TPCH 115 and the FP 120; thus, the FP 120 is less vulnerable to spoofing.

In one embodiment, the FP 120 is contacted by the TPCH 115 requesting a generic credit approval of a particular account. Thus the FP 120 receives a minimal amount of information. In one embodiment, the transaction information, including the identification of goods being purchased with the credit need not be passed to the FP 120. The TPCH 115 can request the credit using a dummy charge ID that can be listed in the monthly credit statement sent to the user, so that the user can reconcile his credit statement. Further, the personal transaction device 105 can include functionality to cause the credit statement to convert the dummy charge ID back to the transactional information so that the credit statement appears to be a conventional statement that lists the goods that were purchased and the associated amount charged.

A display input device 160 (shown in phantom) may be included to enable the user, or in some embodiments the vendor 125, to display status and provide input regarding the PTD 105 and the status of the transaction to be performed.

In yet another embodiment, an entry point 110 interfaces with the personal transaction device 170 and also communicates with the TPCH 115. The entry point 110 may be an existing (referred to herein as a legacy POS terminal) or a newly configured point of sale (POS) terminal located in a retail environment. The user 140 uses the PTD 170 to interface to the POS terminal in a manner similar to how credit cards and debit cards interface with POS terminals. The entry point 110 may also be a public kiosk, a personal computer, or the like.

The system described herein also provides a distribution functionality 130 whereby products purchased via the system are distributed. In one embodiment, the distribution function 130 is integrated with the TPCH 115 functionality. In an alternate embodiment, the distribution function 130 may be handled by a third party. Utilizing either approach, the system ensures user privacy and data security. The distribution function 130 interacts with the user through PTD 130 to ship the product to the appropriate location. A variety of distribution systems are contemplated, for example, electronic distribution through a POS terminal coupled to the network, electronic distribution direct to one or more privacy cards and/or digital wallets, or physical product distribution. In one embodiment for physical product distribution, an "anonymous drop-off point", such as a convenience store or other ubiquitous location is used. In another embodiment, it involves the use of a "package distribution kiosk" that allows the user to retrieve the package from the kiosk in a secure fashion. However, in one embodiment, the user may use PTD 170 to change the shipping address of the product at any time during the distribution cycle.

A user connects to and performs transactions with a secure transaction system (such as shown in FIG. 1) through a personal transaction device (PTD) that has a unique identifier (ID). In one embodiment, a privacy card is used. In an alternate embodiment a digital wallet is used. In yet another alternate embodiment, a privacy card in conjunction with a digital wallet is used.

Figure 2:
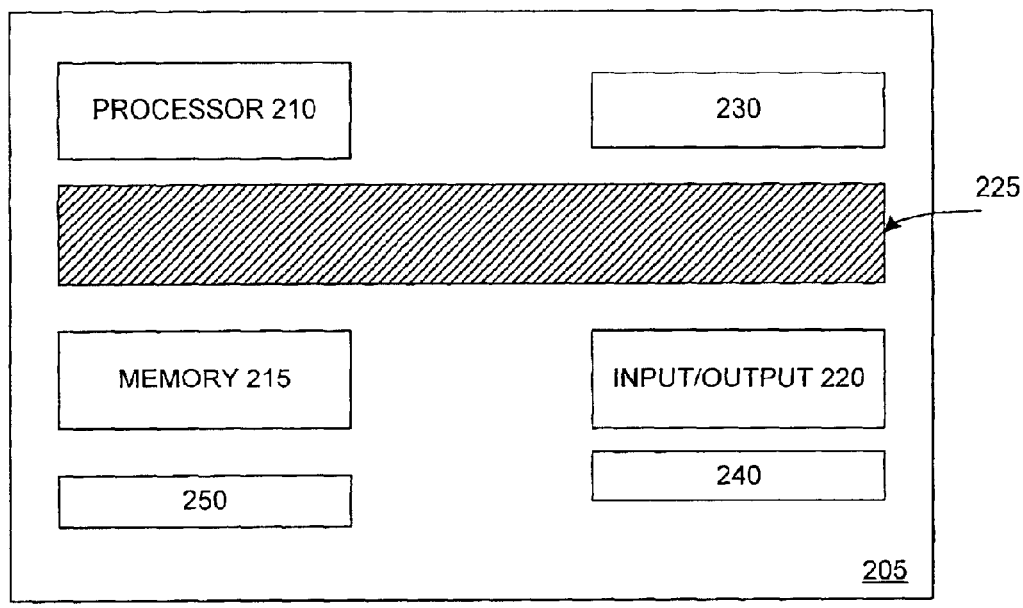
FIG. 2 is a simplified block diagram of one embodiment of a privacy card for a personal transaction device.

One embodiment of a privacy card 205 is illustrated in FIG. 2. In one embodiment, the card 205 is configured to be the size of a credit card. The privacy card includes a processor 210, memory 215 and input/output logic 220. The processor 210 is configured to execute instructions to perform the functionality herein. The instructions may be stored in the memory 215. The memory is also configured to store data, such as transaction data and the like. In one embodiment, the memory 215 stores the transaction ID used to perform transactions in accordance with the teachings of the present invention. Alternately, the processor may be replaced with specially configured logic to perform the functions described here.

The input/output logic 220 is configured to enable the privacy card 205 to send and receive information. In one embodiment, the input/output logic 220 is configured to communicate through a wired or contact connection. In another embodiment, the logic 220 is configured to communicate through a wireless or contactless connection. A variety of communication technologies may be used.

In one embodiment, a display 225 is used to generate bar codes scanable by coupled devices and used to perform processes as described herein. The privacy card 205 may also include a magnetic stripe generator 240 to simulate a magnetic stripe readable by devices such as legacy POS terminals.

In one embodiment, biometric information, such as fingerprint recognition, is used as a security mechanism that limits access to the card 205 to authorized users. A fingerprint touch pad and associated logic 230 is therefore included in one embodiment to perform these functions. Alternately, security may be achieved using a smart card chip interface 250, which uses known smart card technology to perform the function.

Memory 215 can have transaction history storage area. The transaction history storage area stores transaction records (electronic receipts) that are received from POS terminals. The ways for the data to be input to the card include wireless communications and the smart card chip interface which functions similar to existing smart card interfaces. Both of these approaches presume that the POS terminal is equipped with the corresponding interface and can therefore transmit the data to the card.

Memory 215 can also have user identity/account information block. The user identity/account information block stores data about the user and accounts that are accessed by the card. The type of data stored includes the meta account information used to identify the account to be used.

Figure 3:
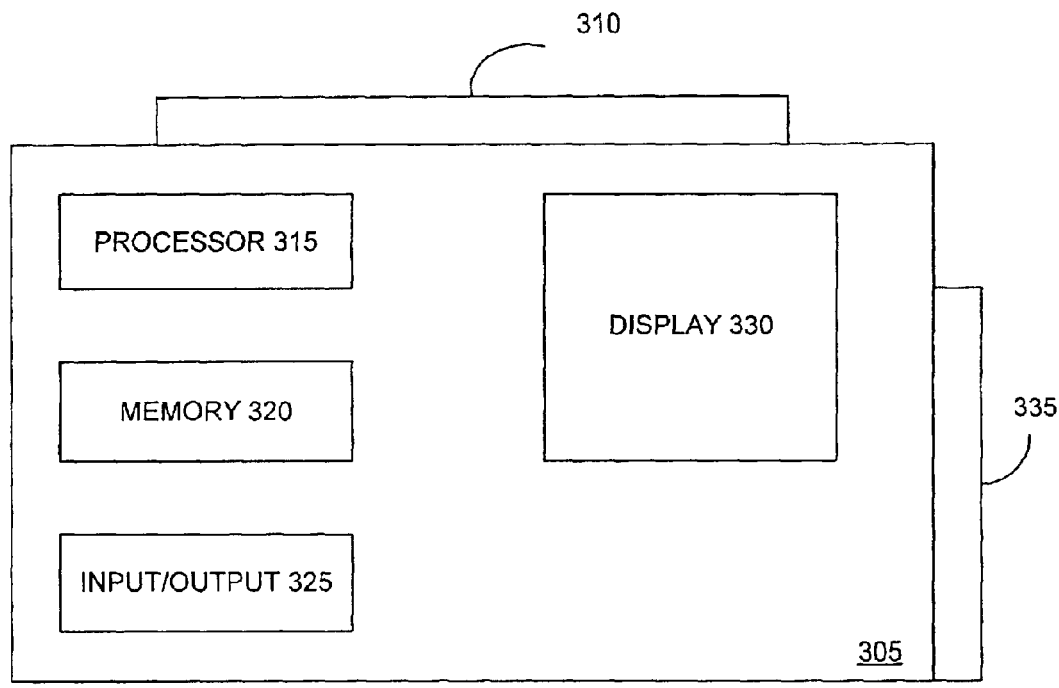
FIG. 3 is a simplified block diagram of one embodiment of a digital wallet for a personal transaction device.

One embodiment of a digital wallet 305 is illustrated in FIG. 3. The digital wallet 305 includes a coupling input 310 for the privacy card 205, processor 315, memory 320, input/output logic 325, display 330 and peripheral port 335. The processor 315 is configured to execute instructions, such as those stored in memory 320, to perform the functionality described herein. Memory 320 may also store data including financial information, eCoupons, shopping lists and the like. The digital wallet may be configured to have additional storage. In one embodiment, the additional storage is in a form of a card that couples to the device through peripheral port 310.

In one embodiment, the privacy card 205 couples to the digital wallet 305 through port 310; however, the privacy card 205 may also couple to the digital wallet 305 through another form of connection including a wireless connection.

Input/output logic 325 provides the mechanism for the digital wallet 305 to communicate information. In one embodiment, the input/output logic 325 provides data to a point-of-sale terminal or to the privacy card 205 in a pre-specified format. The data may be output through a wired or wireless connection.

The digital wallet 305 may also include a display 330 for display of status information to the user. The display 330 may also provide requests for input and may be a touch sensitive display, enabling the user to provide the input through the display.

The physical manifestation of many of the technologies in the digital wallet 305 will likely be different from those in the privacy card 205, mainly because of the availability of physical real estate in which to package technology. Examples of different physical representations would include the display, fingerprint recognition unit, etc.

Moreover, in one embodiment, external and/or detachable storage in reference to the personal transaction device 170 can be employed for the storage of confidential and non-confidential information or data. In an embodiment, this external and/or detachable storage can be communicatively coupled to the privacy card 205 through a port coupled to input/output logic 220. In one embodiment, this external and/or detachable storage can be communicatively coupled to the digital wallet 305 through coupling port 310 and/or peripheral port 335. In one embodiment, the external and/or detachable storage is a memory stick. However, this is by way of example and not by way of limitation as any other detachable memory storage device can be employed for the storage of confidential and non-confidential information or data.

Figure 4:
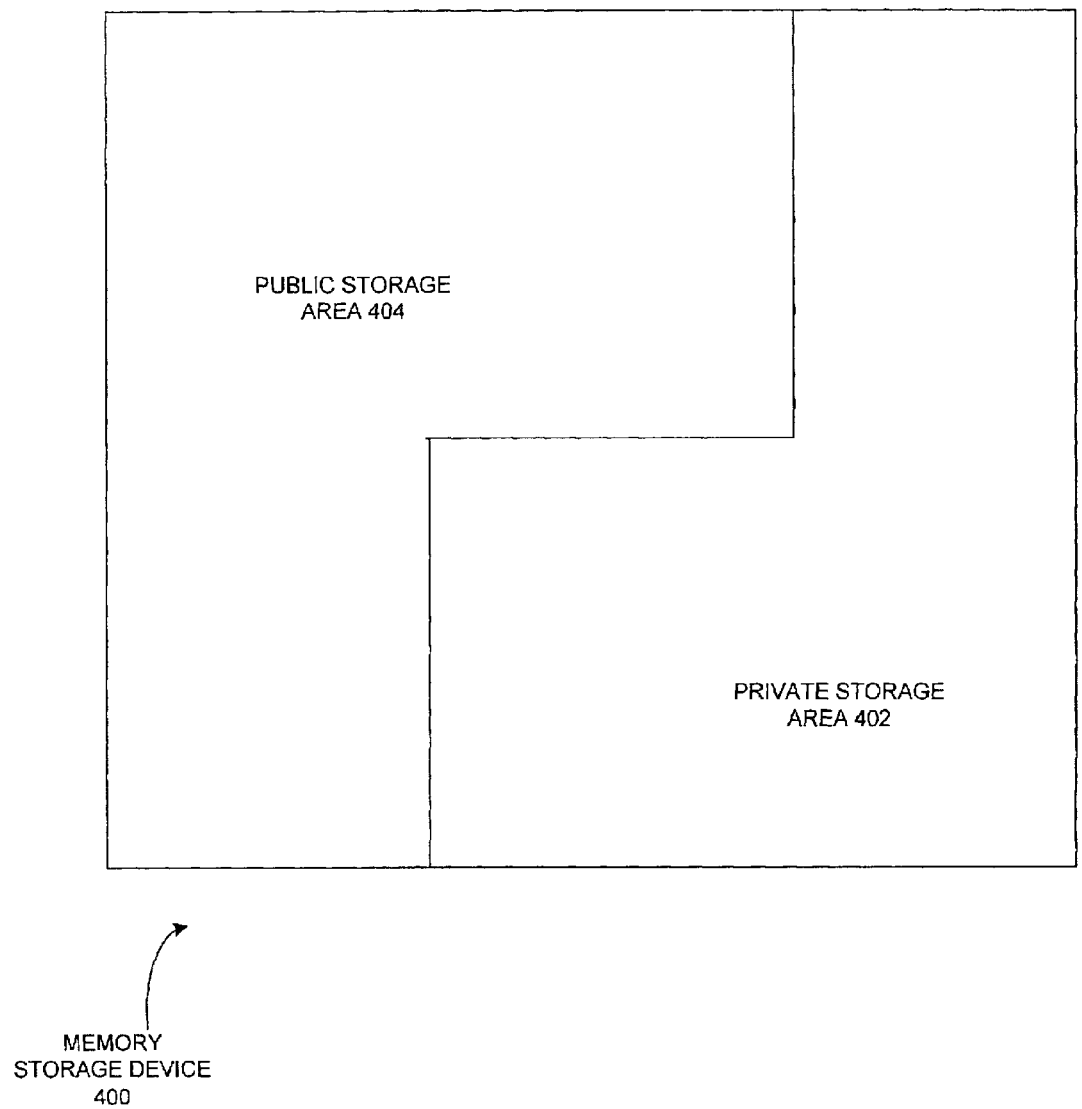
FIG. 4 illustrates an embodiment of a memory storage area within a memory storage device.

FIG. 4 illustrates an embodiment of a memory storage area within a memory storage device. As shown, FIG. 4 includes a memory storage device 400 that includes a private storage area 402 and a public storage area 404. In one embodiment, the data stored within the private storage area 402 is encrypted, using, for example, Magic Gate type technology developed by Sony Corporation.

In such embodiments, keys are exchanged between the transaction device and the memory storage device 400 to allow access to such data. The data stored in the private storage area 402, therefore, can only be accessed when the memory storage device is coupled to, or at least communicating with, the transaction device. In one such embodiment, the keys are unique for each of the memory storage devices 400 and/or the transaction device. Accordingly, if the security is compromised for a given device, only the data stored in that device is subject to the compromise and not other associated devices. For example, if a hacker were to break the code for a given transaction device, such as a digital wallet, only the data stored internally therein could be used and not other transaction devices and memory storage devices associated with the given user. This encryption technique is by way of example and not by way of limitation, as other encryption techniques can be employed. Returning to FIGS. 2 and 3 to help illustrate, the keys for the private storage areas 402 of the memory storage devices 400 can be stored in the memory 215 and memory 220, respectively.

In one embodiment, the user of the transaction device designates what data is considered private and to be stored in the private storage area 402. For example, when the user enters and/or receives data to be stored within a storage area of the transaction device, the user designates whether the data is private and thus to be stored in the private storage area 402. In another embodiment, the transaction device is preconfigured to store data considered private to the user into the private storage area 402. Examples of such private data include, but are not limited to, the user's social security number, the user's mother's maiden name, a car lock combination, a personal identification number (PIN) number and/or password associated with a credit card or Automated Teller Machine (ATM) card.

In one embodiment, the key or code needed to decrypt the encrypted data stored within the private storage area 402 is stored within a personal transaction device, such as a digital wallet, personal digital assistant (PDA), cellular telephone, etc. Accordingly, if the memory storage device 400 were lost or stolen, the data within the private storage area 402 would remain inaccessible without the transaction device that includes the key or code for the encrypted data.

In an embodiment, the memory storage device 400 can interact with devices, such as the different POS terminals described above, independent of a transaction device. In an embodiment, the public storage area 404 would not include the high security features (e.g., encryption) provided for the private storage area 402. Accordingly, the memory stick could interface with other devices, such as the different POS terminals, to allow access to some, such as the public storage area 404, but not all portions of the memory storage device 400. Examples of the types of data to be stored in public storage area 404 include, but are not limited to, a limited amount of cash or eCoupons.

In an embodiment, the memory storage device 400 is dynamically configurable to increase the size of the public storage area 404 while decreasing the private storage area 402 and/or decrease the size of the public storage area 404 while increasing the private storage area 402. In such embodiment, the memory storage device 400 is, therefore, dynamic to accommodate the needs of the user of memory storage device 400. For example, a first user may desire to store a few bytes of data into the private storage area 402, while a second user may desire to store a few megabytes of data in such an area.

This configuration of the memory storage device 400 is by way of example and not by way of limitation. In another embodiment, the sizes of public storage area 404 and private storage area 402 are preconfigured. For example, in one embodiment, the private storage area 402 could occupy 10% of the memory storage device 400, while the public storage area 404 could occupy the remaining 90%.

Figure 5:
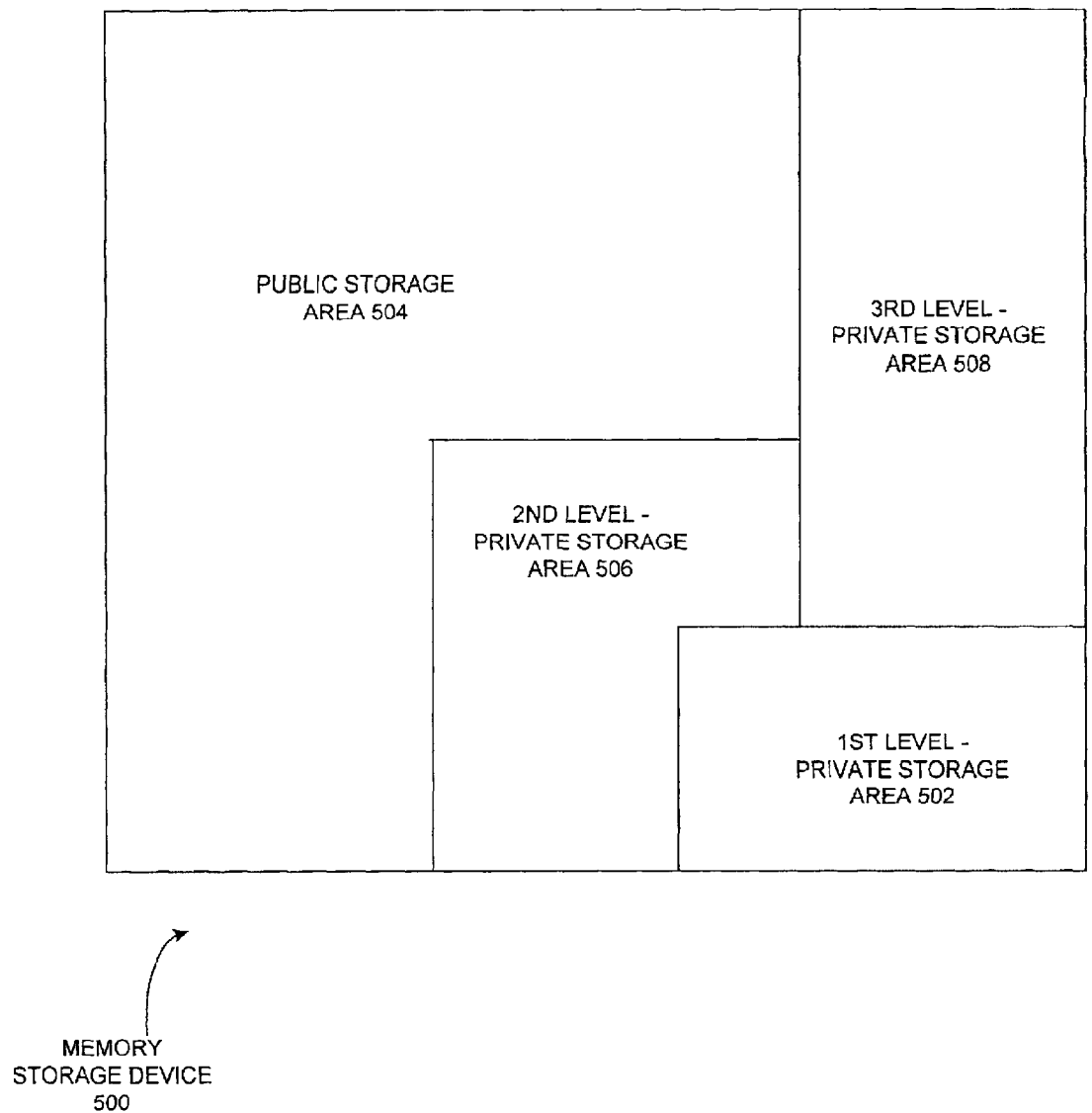
FIG. 5 illustrates another embodiment of a memory storage area within a memory storage device.

FIG. 5 illustrates another embodiment of a memory storage area within a memory storage device. As shown, FIG. 5 includes a memory storage area 500 that includes a public storage area 504, a first level private storage area 502, a second level private storage area 506, a third level storage area 508. In one embodiment, the data stored within the private storage areas 502, 506 and 508 are encrypted, using, for example, Magic Gate type technology developed by Sony Corporation. However, embodiments are not so limited, as other types of encryption may be employed. In an embodiment, the number of different private storage areas within the memory storage 500 is associated with different levels. In one embodiment, these different levels for the private storage areas correspond to different levels of security for the private storage areas. For example, the number of bits for the encryption increases as the level of the private storage areas increases. In another embodiment, the different private storage areas are not associated with different levels of encryption. Rather, the private storage areas have a same level of security or encryption but have different encryption keys. In one such embodiment, the different encryption keys are stored on a same transaction device.

In another embodiment, the different encryption keys are stored on different transaction devices. For example, the key for the first level private storage area 502 could be stored in a first transaction device, while a different encryption key for the second level private storage area 506 could be stored in a second transaction device. Moreover, the key for the third level private storage area 508 could be stored in a different memory storage device.

Similar to the memory storage device 400, in one embodiment, keys are exchanged between the transaction device and the memory storage device 500 to allow access to the data within the private storage areas. The data stored in the private storage area 502, 506 and 508, therefore, can only be accessed when the memory storage device is coupled to or at least communicating with the transaction device or another memory storage device that includes the key for encryption/decryption. In one such embodiment, the keys are unique for each of the memory storage devices 500 and/or the transaction device.

In one embodiment, the user of the transaction device designates what is considered private and what level of privacy to associate with the data. For example, in an embodiment, the user could be presented with the option of high, medium and low, which would correspond to different levels of encryption. In another embodiment, the transaction device is preconfigured to categorize the data into public and different levels of private. Similar to the memory storage device 400, in an embodiment, the memory storage device 500 can interact with devices, such as the different POS terminals described above, independent of the transaction device.

In an embodiment, the memory storage device 500 is dynamically configurable to modify the sizes of the public storage area 504 and the private storage areas 502, 506 and 508. For example, the user can increase the size of the public storage area 504 while decreasing the sizes of the private storage areas 502, 506 and 508. To further illustrate, the user can increase the size of the public storage area 504, while decreasing the size of one of the private storage areas 502, 506 or 508 and keeping the size of the other two private storage areas the same. This configuration of the memory storage device 400 is by way of example and not by way of limitation. In another embodiment, the sizes of public storage area 504 and private storage areas 502, 506 and 508 are preconfigured. For example, in one embodiment, the public storage area 504 could occupy 85% of the memory storage device 500, while each of the private storage areas 502, 506 and 508 could occupy 5%.

Figure 6:
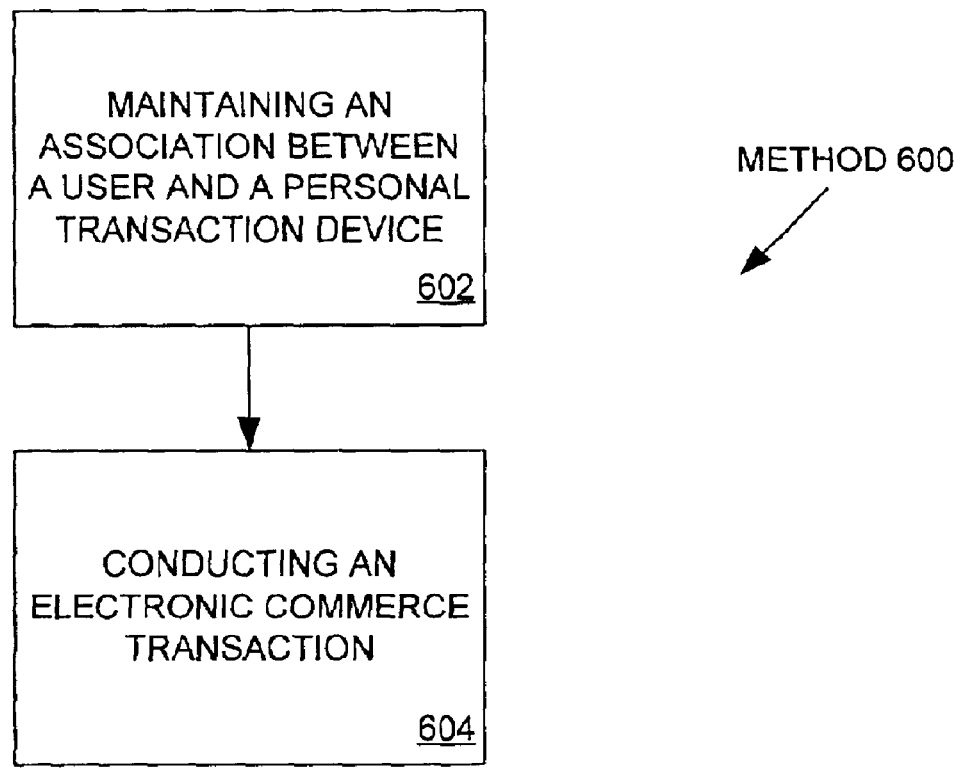
FIG. 6 illustrates an embodiment of a flow diagram for operation of the secure transaction system of FIG. 1.

FIG. 6 illustrates an embodiment of a flow diagram for operation of the secure transaction system of FIG. 1. Method 600 of FIG. 6 commences with maintaining of an association between the user of the personal transaction device and the personal transaction device in the TPCH 115 located in a secure server, at process block 602. In one such embodiment, this association is based on a transaction device identifier that is associated with the user. As previously described in conjunction with FIG. 1, the TPCH 115 maintains a secure database of transaction device information and user information. Accordingly, the TPCH 115 provides the identification of the personal transaction device without the identity of the user to different entities that the user interfaces with using the personal transaction device, such as the vendors 125. In an embodiment, the personal transaction device is communicatively coupled to a detachable memory storage device having public and private storage areas, as described above in conjunction with FIGS. 4 and 5.

Additionally, the TPCH 115 conducts an electronic commerce transaction with an entity, such as the vendors 125, using data stored in the public storage area of the detachable memory storage device that is communicatively coupled to the personal transaction device, at process block 604. For example, the public storage area could include cash or eCoupons that the user may use to purchase from one of the vendors 125 through TPCH 115 without such a vendor knowing the identity of the user.

Figure 7:
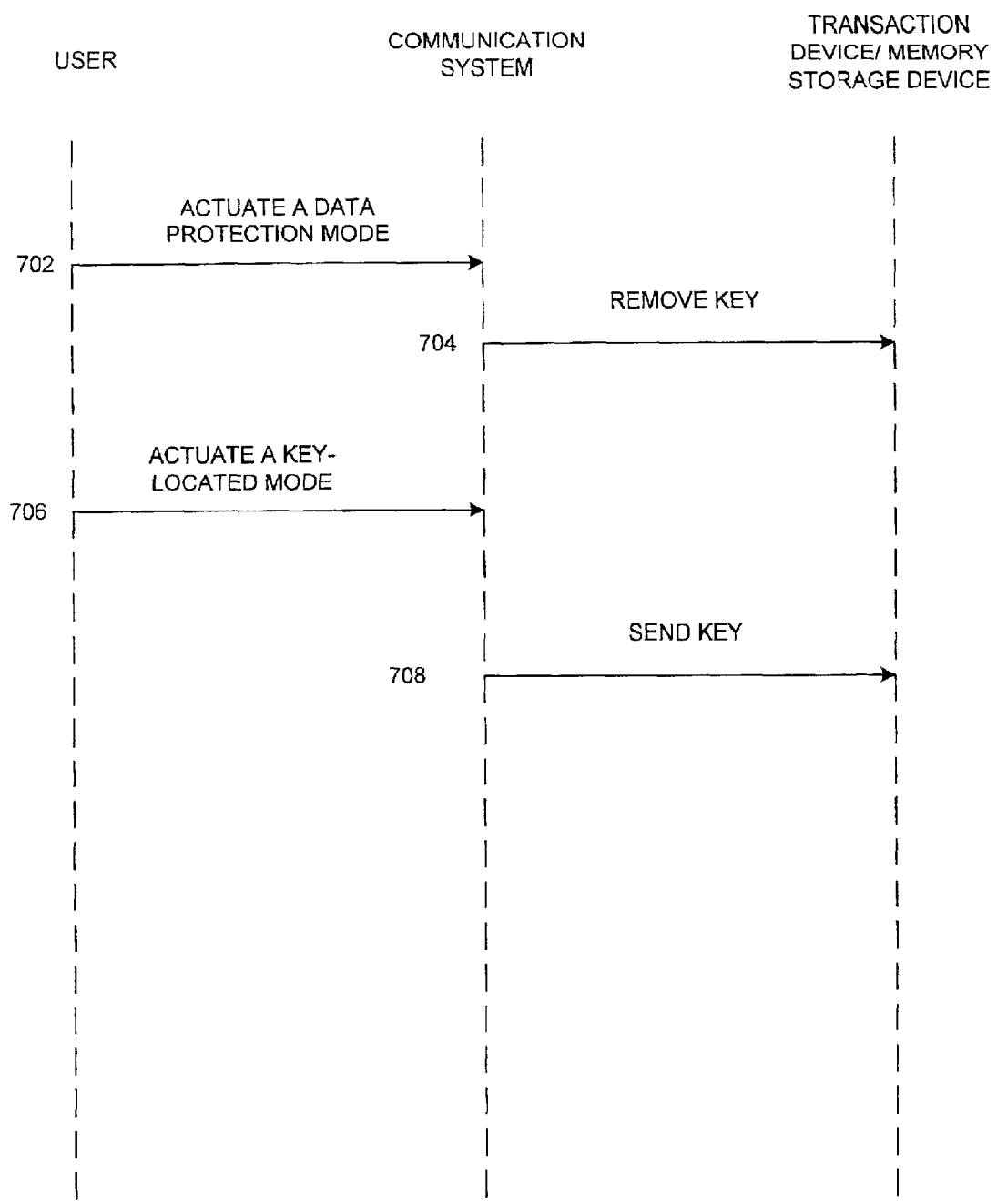
FIG. 7 illustrates one embodiment of protecting confidential information in the memory storage device illustrated in FIGS. 4 and 5.

FIG. 7 illustrates one embodiment of protecting confidential information in the memory storage device illustrated in FIGS. 4 and 5. In this embodiment, the key to encrypt and decrypt the data from the private storage area of a memory storage device is stored within a transaction device. In one embodiment, the process illustrated in FIG. 7 is activated by the user of the memory storage device when the memory storage device is lost or stolen from the user. Accordingly, the user actuates a data protection mode for the memory storage device to cause the removal of the key from the transaction device, at operation 702. In particular, the user transmits a signal to a communications system. Examples of different communications system include, but are not limited to, a server, a cellular-based system, a satellite system, a local wireless network and any other type of wireless-based system.

To help illustrate, a user could dial a telephone number that would cause the transmission of a signal indicating a data protection mode for their memory storage device to the given communication system. In another embodiment, the user could cause the transmission of this signal by logging into a web site and indicating their desire to actuate the data protection mode for their memory storage device. In one such embodiment, the web site could be the TPCH, as described above. The above embodiments illustrating how the user transmits the signal indicating a data protection mode are by way of example and not by way of limitation, as other techniques could be employed for the user to transmit this signal. For example, in another embodiment, the user could call a customer service representative, who would transmit this signal to the communication system after the representative determines that the user is properly authorized.

The communication system transmits a signal to the transaction device or memory storage device to remove or delete the key that allows access to the private storage area of the memory storage device, at operation 704. In one embodiment, the communication system transmits this signal to the transaction device or the memory storage device through a wireless communication. This signal can include the identification of the associated transaction device or memory storage device, the given memory storage device and the identification of the key for the area within the given memory storage device to be removed. Upon receipt of this signal, in one embodiment, the transaction device or memory storage device removes the keys associated with the memory storage device, thereby removing the keys that allow access to the encrypted data stored in the private storage area(s). In an embodiment, the communication system retains a copy of the key, which is to be deleted within the transaction device, in a secured area.

As illustrated by FIG. 7, embodiments also allow for the reactivation/replacement of a key for a private storage area that is stored in another device. For example, if the user were to recover the memory storage device, the user could actuate a key-located mode, at operation 706. In particular, the user transmits a signal to the communications system, as described above. Similar to the operation 702, examples of how the user could communicate the signal to the communication system include dialing a telephone number, logging into a web site or contacting a customer service representative.

The communication system transmits a signal, which contains the key for encryption for the private storage area that was deleted in operation 704, to the transaction device or memory storage device, at operation 708. In one embodiment, the communication system transmits this signal to the transaction device or the memory storage device through a wireless communication. This signal can include the identification of the associated transaction or memory storage device, the given memory storage device that includes the encrypted data, the particular memory storage area therein as well as the key for encryption. Upon receipt of this signal, the transaction device or memory storage device stores the key for the particular memory storage area into memory therein.

The restoration of the key into the transaction device and/or memory storage device illustrated in FIG. 7 is by way of example and not by way of limitation. In an embodiment, the transaction device or memory storage device into which the key is to be restored can be communicatively coupled to a user's home computer. The user can then couple the transaction device or memory storage device to the communication system using the computer. For example, the transaction device or memory storage device could be inserted into a cradle that is coupled to the user's home computer. Accordingly, if the communication system were a server coupled to the Internet, the user could connect to the server using their computer, thereby allowing the downloading of the key from the server to the transaction device or memory storage device. In one such embodiment, a virtual private network (VPN) could be established between the user's computer and the server to provide a heightened level of security there between.

The embodiment of the process of protecting confidential information illustrated in FIG. 7 is by way of example and not by way of limitation. In another embodiment, the key, and its removal and reassertion can be with devices other than the transaction device. For example, in another embodiment, the key could be stored in a user's home computer, thereby allowing accessing to the confidential information through a device, such as a personal POS terminal, attachable to the computer. In another embodiment, the key could be stored in another memory storage device, in either its private or public storage area. Accordingly, the communication system could communicate with the home computer or the other memory storage device for the removal and reassertion of the key to access the encrypted data for the memory storage device.

It will be appreciated that that more or fewer processes may be incorporated into the method(s) illustrated in different figure illustrating the flow diagrams without departing from the scope of the invention and that no particular order is implied by the arrangement of blocks shown and described herein. It further will be appreciated that the method(s) described in conjunction with such figures may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components. The methods may be provided as a computer program product that may include a machine-readable medium having stored thereon instructions which may be used to program a computer (or other electronic devices) to perform the methods. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result. It will also be appreciated.

The components of a secure transaction system illustrated in FIGS. 1, 2 and 3 are further described in PCT published patent application number US00/35619, which is assigned to the same assignee as the present application and which is hereby incorporated by reference. Embodiments have been described in conjunction with the preferred embodiment. It is evident that numerous alternatives, modifications, variations and uses will be apparent to those skilled in the art in light of the foregoing description.

What is claimed is:

1. An electronic transaction device comprising:
   a transaction device identifier, the identifier providing no apparent identification of a user authorized to use the electronic transaction device;
   communication logic configured to communicate the transaction device identifier to a system to perform a transaction, the system comprising a secure mechanism for correlating the device identifier and user; and
   a detachable memory device configured to include a public storage area and a private storage area, wherein the private storage area is to store confidential data that is to be encrypted with a key that is stored within memory of the electronic transaction device.

2. The electronic transaction device as set forth in claim 1, wherein the public storage area of the detachable memory device is to be accessible without the key from the user transaction device.

3. The electronic transaction device as set forth in claim 1, wherein the private storage area comprises a number of private storage areas and wherein different keys for accessing each of the number of private storage areas are to be stored in the electronic transaction device.

4. The electronic transaction device as set forth in claim 3, wherein the number of private storage areas is associated with different levels of encryption.

5. The electronic transaction device as set forth in claim 1, wherein a data protection mode signal is operable to be wirelessly transmitted to the electronic transaction device to cause the electronic transaction device to remove the key that is to encrypt the private storage area of the memory storage device.

6. The electronic transaction device as set forth in claim 5, wherein the data protection mode signal is to be wirelessly transmitted to the electronic transaction device using a communication system.

7. The electronic transaction device as set forth in claim 5, wherein a key-located mode signal is operable to be wirelessly transmitted to the electronic transaction device to cause the electronic transaction device to store the key for encryption of the private storage area, wherein the key-located mode signal is to include the key for encryption of the private storage area.

8. The electronic transaction device as set forth in claim 1, wherein the transaction device is selected from the group consisting of a privacy card, digital wallet, and a privacy card configured to be coupled to a digital wallet.

9. The electronic transaction device as set forth in claim 1, wherein the security logic is selected from logic to confirm an identification selected from the group consisting of a PIN code and fingerprint.

10. The electronic transaction device as set forth in claim 1, wherein the communication logic is selected from the group consisting of a smart card chip interface, contactless connection, magnetic stripe and wireless connection.

11. The electronic transaction device as set forth in claim 1, further comprising a transaction history storage area configured to store transaction records.

12. The electronic transaction device as set forth in claim 1, further comprising a financial data storage area configured to store information selected from the group consisting of eCoupons, account balances and other data used during a transaction.

13. The electronic transaction device as set forth in claim 1, wherein the communication logic is configured to accept direct marketing information.

14. An electronic transaction device comprising:
a processor;
an internal memory coupled to the processor, wherein a transaction device identifier is to be stored within the internal memory, the transaction device identifier to provide no apparent identification of a user authorized to use the electronic transaction device;
a peripheral port coupled to the processor and the internal memory, wherein the peripheral port is operable to be communicatively coupled to an external memory storage device, wherein the external memory storage device is configured to include a public storage area and a private storage area, wherein the private storage area is to store confidential data that is to be encrypted with a key that is stored within the internal memory of the electronic transaction device; and
an electronic commerce process to be executed by the processor to cause the processor to conduct an electronic commerce transaction with a vendor using data stored in the public storage area of the detachable memory storage device.

15. The electronic transaction device as set forth in claim 14, wherein the public storage area of the detachable memory device is to be accessible without the key from the user transaction device.

16. The electronic transaction device as set forth in claim 14, wherein the private storage area comprises a number of private storage areas and wherein different keys for accessing each of the number of private storage areas are to be stored in the electronic transaction device.

17. The electronic transaction device as set forth in claim 16, wherein the number of private storage areas is associated with different levels of encryption.

18. The electronic transaction device as set forth in claim 14, further comprising a wireless communication interface coupled to the processor to receive a data protection mode signal and wherein the processor removes the key that is to encrypt the private storage area of the memory storage device in response to receipt of the data protection mode signal.

19. The electronic transaction device as set forth in claim 14, further comprising a wireless communication interface coupled to the processor to receive a key-located mode signal that includes the key for encryption of the private storage area, and wherein the processor stores the key for encryption of the private storage area in response to receipt of the key-located mode signal.

20. An electronic system comprising:
a user transaction device that provides a device identifier when coupled to a transaction terminal, wherein said transaction terminal is configured to indicate that a transaction is to be performed when coupled to the user transaction device; and
a transaction privacy clearinghouse (TPCH), coupled selectively to the user transaction device when the transaction is to be performed, said TPCH coupled to receive the device identifier and accessible data, wherein the accessible data is to be stored in a public storage area of a memory storage device that can be communicatively coupled to the user transaction device, said TPCH authorizing the transaction based upon the device identifier and the accessible data that includes account information of a user that is authorized to use the user transaction device,
wherein the transaction is authorized without providing the identity of the user to the transaction terminal and wherein the memory storage device is to include a private storage area for storage of confidential data such that the private storage area is to be encrypted with a key that is to be stored in the user transaction device.

21. The electronic system as set forth in claim 20, wherein the memory storage device is detachable from the user transaction device.

22. The electronic system as set forth in claim 20, and wherein the public storage area of the memory storage device is to be accessible without the key from the user transaction device.

23. The electronic system as set forth in claim 20, wherein the private storage area comprises a number of private storage areas and wherein different keys for accessing each of the number of private storage areas are to be stored in the user transaction device.

24. The electronic system as set forth in claim 23, wherein the number of private storage areas are associated with different levels of encryption.

25. The electronic system as set forth in claim 20, wherein a data protection mode signal is operable to be wirelessly transmitted to the user transaction device to cause the user transaction device to remove the key that is to encrypt the private storage area of the memory storage device.

26. The electronic system as set forth in claim 25, wherein the data protection mode signal is to be wirelessly transmitted to the user transaction device using a communication system.

27. The electronic system as set forth in claim 25, wherein a key-located mode signal is operable to be wirelessly transmitted to the user transaction device to cause the user transaction device to store the key for encryption of the private storage area, wherein the key-located mode signal is to include the key for encryption of the private storage area.

28. The electronic system as set forth in claim 20, wherein the transaction terminal is selected from the group consisting of a point of sale (POS) terminal, home computer system, bank automatic teller machine (ATM) terminal, digital television, Internet Appliance, and personal POS terminal.

29. The electronic system as set forth in claim 20, wherein the transaction device is selected from the group consisting of a privacy card, digital wallet, and a privacy card configured to be coupled to a digital wallet.

30. The electronic system as set forth in claim 20, wherein the TPCH is further configured to selectively couple to a financial institution.

31. The electronic system as set forth in claim 20, wherein the TPCH further comprises a financial institution.

32. The electronic system as set forth in claim 20, wherein the TPCH comprises a secure database of transaction device information and user information, said database accessed for authorizing a transaction.

33. The electronic system as set forth in claim 20, wherein the TPCH is configured to interface to a financial processing system configured to perform financial transactions associated with the transaction.

34. The electronic system as set forth in claim 33, wherein the financial processing system is configured to transfer funds in an amount associated with the transaction from a user's account to an account of a vendor of the transaction.

35. The electronic system as set forth in claim 20, further comprising a distribution system configured to provide a product of the transaction to the user.

36. The electronic system as set forth in claim 20, wherein the TPCH further comprises a distribution system configured to provide a product of the transaction to the user.

37. The electronic system as set forth in claim 20, wherein the TPCH is further configured to perform operations selected from the group consisting of data mining based upon transactions performed and direct marketing to a transaction device of the user.

38. The electronic system as set forth in claim 37, wherein results of data mining are provided without identification of the user and direct marketing is performed without identifying the user.

39. The electronic system as set forth in claim 20, wherein the transaction terminal, transaction device and TPCH are further configured to verify the legitimacy of each other.

40. A method for permitting a user to conduct electronic commerce transactions, the method comprising:
in a secure server, maintaining an association between the user and a transaction device using a transaction device identifier that corresponds to the user, wherein the transaction device is communicatively coupled to a detachable memory storage device having a public storage area and a private storage area, the private storage area being encrypted with a key that is stored in the transaction device; and
conducting an electronic commerce transaction with a vendor using data stored in the public storage area of the detachable memory storage device.

41. The method of claim 40, wherein the private storage area comprises a number of private storage areas and wherein different keys for accessing each of the number of private storage areas are to be stored in the transaction device.

42. The method of claim 41, wherein the number of private storage areas are associated with different levels of encryption.

43. The method of claim 40, wherein a data protection mode signal is operable to be wirelessly transmitted to the transaction device to cause the transaction device to remove the key that is to encrypt the private storage area of the memory storage device.

44. The method of claim 43, wherein a key-located mode signal is operable to be wirelessly transmitted to the transaction device to cause the transaction device to store the key for encryption of the private storage area, wherein the key-located mode signal is to include the key for encryption of the private storage area.

45. The method of claim 40, wherein the electronic commerce transaction is conducted without requiring the user to reveal personal identification information to the vendor.

46. The method of claim 40, wherein a set of personal identification information corresponding to the user is obtained and associated to the transaction device identifier upon a registration of the transaction device.

47. The method of claim 46, wherein pursuant to the electronic commerce transaction, the delivery of content to the user is initiated using the set of personal identification information.

48. The method of claim 40, wherein pursuant to the electronic commerce transaction, the delivery of content to the user is initiated using the device identifier.

49. The method of claim 40, wherein pursuant to the electronic commerce transaction, the delivery of content to the user is performed without providing personal information of the user.

50. A machine-readable medium that provides instructions for permitting a user to conduct electronic commerce transactions, which when executed by a machine, cause said machine to perform operations comprising:
in a secure server, maintaining an association between the user and a transaction device using a transaction device identifier that corresponds to the user, wherein the transaction device is communicatively coupled to a detachable memory storage device having a public storage area and a private storage area, such that the private storage area is encrypted with a key that is stored in the transaction device; and
conducting an electronic commerce transaction with a vendor using data stored in the public storage area of the detachable memory storage device.

51. The machine-readable medium of claim 50, wherein the private storage area comprises a number of private storage areas and wherein different keys for accessing each of the number of private storage areas are to be stored in the transaction device.

52. The machine-readable medium of claim 51, wherein the number of private storage areas are associated with different levels of encryption.

53. The machine-readable medium of claim 50, wherein a data protection mode signal is operable to be wirelessly transmitted to the transaction device to cause the transaction device to remove the key that is to encrypt the private storage area of the memory storage device.

54. The machine-readable medium of claim 53, wherein a key-located mode signal is operable to be wirelessly transmitted to the transaction device to cause the transaction device to store the key for encryption of the private storage area, wherein the key-located mode signal is to include the key for encryption of the private storage area.

55. The machine-readable medium of claim 50, wherein the electronic commerce transaction is conducted without requiring the user to reveal personal identification information to the vendor.

56. The machine-readable medium of claim 50, wherein a set of personal identification information corresponding to the user is obtained and associated to the transaction device identifier upon a registration of the transaction device.

57. The machine-readable medium of claim 56, wherein pursuant to the electronic commerce transaction, the delivery of content to the user is initiated using the set of personal identification information.

58. The machine-readable medium of claim 50, wherein pursuant to the electronic commerce transaction, the delivery of content to the user is initiated using the device identifier.

59. The machine-readable medium of claim 50, wherein pursuant to the electronic commerce transaction, the delivery of content to the user is performed without providing personal information of the user.

60. The machine-readable medium of claim 50, further comprising contacting a financial processing system configured to transfer funds in an amount associated with the transaction from the user's account to an account of a vendor of the transaction.

61. The machine-readable medium of claim 60, wherein the financial processing system does not know the user's personal information.

62. The machine-readable medium of claim 60, wherein the financial processing system does not know subject information of the transaction.

63. The machine-readable medium of claim 50, further comprising performing data mining operations related to the transaction.

64. The machine-readable medium of claim 50 further comprising performing direct marketing to the user utilizing the transaction device as the receiver of marketing information.

* * * * *